US012766408B2

(12) United States Patent
Millson

(10) Patent No.: US 12,766,408 B2
(45) Date of Patent: Oct. 20, 2026

(54) APPARATUS, SYSTEMS AND METHODS FOR IMAGE PROCESSING

(71) Applicant: Sony Interactive Entertainment Inc., Tokyo (JP)

(72) Inventor: Jason Craig Millson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 172 days.

(21) Appl. No.: 18/584,107

(22) Filed: Feb. 22, 2024

(65) Prior Publication Data

US 2024/0293741 A1 Sep. 5, 2024

(30) Foreign Application Priority Data

Mar. 3, 2023 (GB) ..................................... 2303155

(51) Int. Cl.
*A63F 13/52* (2014.01)
*A63F 13/77* (2014.01)

(52) U.S. Cl.
CPC .............. *A63F 13/52* (2014.09); *A63F 13/77* (2014.09)

(58) Field of Classification Search
CPC ................................ A63F 13/52; A63F 13/77
See application file for complete search history.

(56) References Cited

U.S. PATENT DOCUMENTS

2006/0092325 A1* 5/2006 Salomons ........ H04N 21/41265 348/565
2012/0094757 A1 4/2012 Vago
2015/0262402 A1 9/2015 Heinz, II
2018/0316942 A1* 11/2018 Todd ................. H04N 21/6587
2022/0060775 A1 2/2022 Van Os
2022/0197382 A1 6/2022 LeBeau et al.

OTHER PUBLICATIONS

Extended European Search Report for corresponding EP Application 2415627.2, 8 pages, Aug. 1, 2024.
Combined Search and Examination Report for corresponding GB Application 2303155.2, 6 pages, Sep. 8, 2023.

* cited by examiner

*Primary Examiner* — Werner G Garner
(74) *Attorney, Agent, or Firm* — Fish & Richardson P.C.

(57) ABSTRACT

A data processing apparatus includes first image processing circuitry to generate first video images for an interactive content for display to a user, communication circuitry to receive, via a network, portable device data indicative of a state of a software application executed on a portable device associated with the user, second image processing circuitry to generate one or more second video images for display in dependence on the portable device data, control circuitry to set a control value in response to a user input by the user, and output circuitry to selectively output one of a first video image and a composite video image in dependence on the control value, where the composite video image comprises a portion comprising at least some of the first video image and another portion comprising at least some of a second video image.

20 Claims, 3 Drawing Sheets

APPARATUS, SYSTEMS AND METHODS FOR IMAGE PROCESSING

FIELD OF THE INVENTION

The present disclosure relates to the field of processing data, and more particularly to processing video images.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Software applications that can be downloaded and run by portable devices such as smartphone devices, smartwatch devices and tablet devices are increasingly becoming part of everyday life. Through such portable devices users may access various software applications for a range of different purposes. Examples of such software applications can include instant messaging software applications, social media applications, navigation applications, software applications associated with cloud-based streaming platforms and weather forecasting applications among many others.

During participation of a session for an interactive content, such as a video game or other type of interactive content, users typically participate and progress the interactive content through various user inputs. In the case of a video game, a user typically views video images for the video game on a display device and provides user inputs using one or more input devices. During sessions for such interactive content, directing attention away from the interactive content (even briefly) to instead view a portable device may not be possible without consequence for the progression of the interactive content. For example, some types of interactive content, such as some video games, require high levels of user attention. Alternatively or in addition, some types of interactive content may or may not allow pausing of the content, and pausing can result in loss of immersion. Hence, there is a need to improve usability of interactive content.

It is in this context that the present disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DETAILED DESCRIPTION

Figure 1:
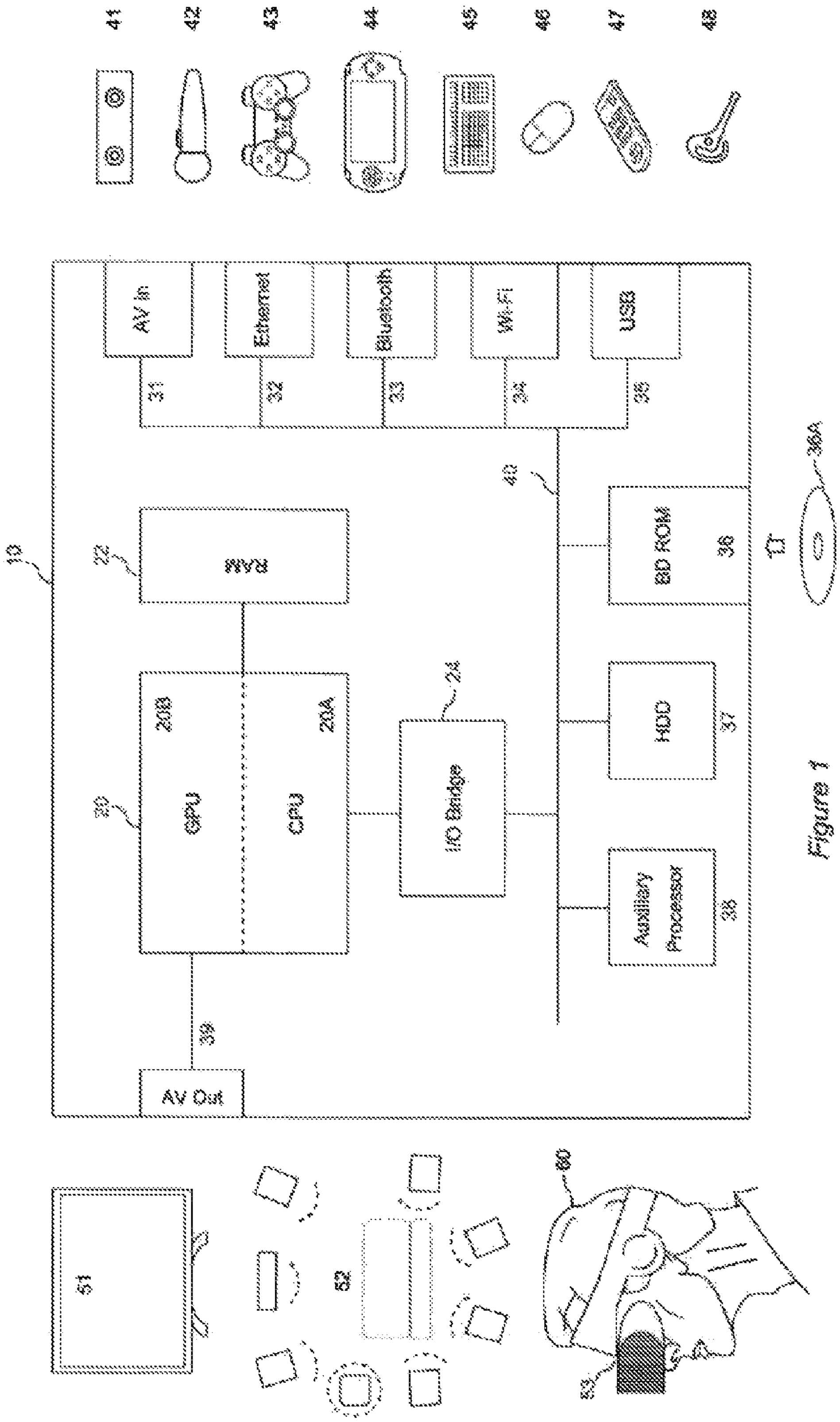
FIG. 1 is a schematic diagram illustrating an example of an entertainment device.

Embodiments of the invention will now be described, by way of example only, with reference to the accompanying drawings, in which:

FIG. 1 schematically illustrates an example entertainment device such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ® or DualSense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of an entertainment device suitable for performing processing for executing interactive content and generating video images and audio for output to a user. The entertainment device may for example generate images for display by a display device such as the television 51 and/or the head mounted display unit 53.

The inventors have appreciated that during output of interactive content, such as a video game, a user may typically have one or more portable devices available to them and that, for various reasons, the user may seek to view content on their portable device(s) during the session for the interactive content. For example, a user may wish to use their portable device to view a message from a friend during the session for the interactive content and/or view information regarding other users that are currently online. Alternatively or in addition, the user may wish to view content associated with one or more software applications installed on the portable device which may provide supplementary information with respect to the interactive content.

Hence, the user may attempt to view content on their portable device one or more times during the session for the interactive content. In order to view such content, the user will typically locate their portable device (which may be particularly problematic in cases where the user is wearing an HMD) and provide one or more inputs with respect to the portable device to view content on a screen of their portable device. This can result in the user being distracted from the displayed interactive content and/or the user having to pause the interactive content (which may not always be possible for some types of interactive content such as a massively multiplayer online video game). In addition to this, user inputs for progressing the interactive content may be provided by the user operating a handheld controller, and interaction with the portable device may require the user to temporarily stop using the handheld controller. There is therefore a need to improve usability of interactive content.

Figure 2:
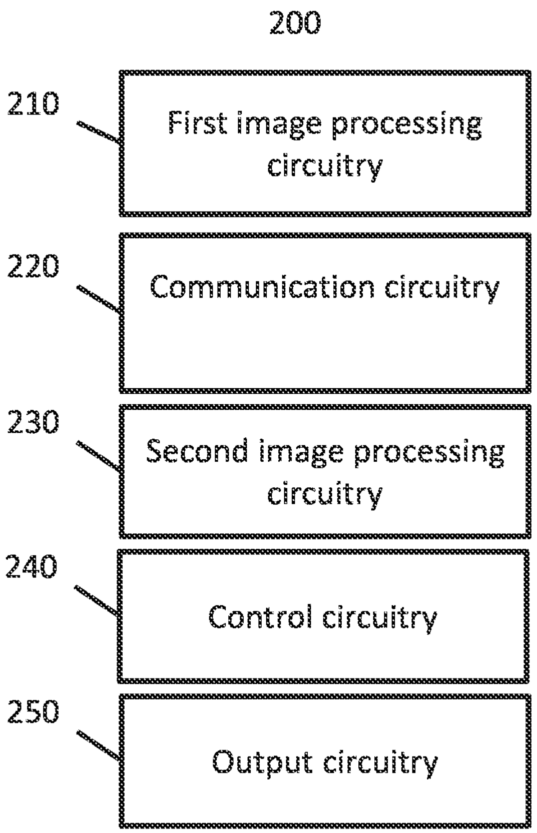
FIG. 2 is a schematic diagram illustrating a data processing apparatus.

FIG. 2 schematically illustrates a data processing apparatus 200 in accordance with embodiments of the disclosure. The data processing apparatus 200 comprises first image processing circuitry 210, communication circuitry 220, second image processing circuitry 230, control circuitry 240 and output circuitry 250. The data processing apparatus 200 may in some cases be provided as part of an entertainment device such as that described with respect to FIG. 1.

The first image processing circuitry 210 is configured to generate video images for an interactive content for display to a user. In the following discussion, video images generated by the first image processing circuitry 210 are referred to as first video images. The first video images can be displayed to the user by one or more display devices such as a display monitor (e.g. television) and/or an HMD worn by the user. The communication circuitry 220 is configured to receive, via a network, portable device data indicative of a state of at least one software application executed on a portable device associated with the user. The second image processing circuitry 230 is configured to generate one or more second video images for display in dependence on the portable device data. In the following discussion, video images generated by the second image processing circuitry 230 are referred to as second video images. The control circuitry 240 is configured to set a control value in response to a user input by the user. The output circuitry 250 is configured to selectively output one of a first video image and a composite video image in dependence on the control value, wherein the composite video image comprises a portion comprising at least some of the first video image and another portion comprising at least some of a second video image.

Therefore, the output circuitry 250 selectively outputs one of the first video image and the composite video image. When selected, the first video image can be output for displaying the interactive content to the user. For example, a sequence of first video images generated by the first image processing circuitry 210 may comprise video images for an interactive content such as a video game, and the sequence of first video images can be output for display to the user when the control value indicates that first video images are to be output.

When selected, the composite video image can be output, in which the composite image simultaneously displays the interactive content and also content associated with a software application run on the user's portable device. A sequence of composite video images each generated by compositing a first video image generated by the first image processing circuitry 210 and a second video image generated by the second image processing circuitry 230 can be output for display to the user when the control value indicates that composite video images are to be output. For example, a second video image may comprise content associated with a software application executed on the portable device, such as content for an instant messaging software application or other suitable software application. Examples of content that may be included in the one or more second video images are discussed in more detail later. Hence, a sequence of composite video images can be output to the user which each comprise a first video image for allowing the user to continue participation with the interactive content and also comprise at least one portion comprising content associated with one or more software applications executed on the user's portable device(s).

This can allow content associated with the user's portable device to be viewed in a more seamless manner that can allow uninterrupted user interaction with the interactive content. For example, a composite video image may comprise a first portion comprising at least some of a first video image for depicting a current state of the interactive content and a second portion that is arranged next to the first portion, or overlaid on the first portion, in which the second portion comprises at least some of a second video image for depicting content associated with the state of the software application executed on the portable device.

In some examples, the data processing apparatus 200 comprises processing circuitry (e.g. CPU 20A) to perform processing to process an interactive content (such as a video game) in dependence on one or more user inputs, and the first image processing circuitry (e.g. GPU 20B) performs image processing to generate first video images for the interactive content for display to a user.

In other examples, a so-called cloud-based video game may be executed by one or more servers and image data generated by one or more servers may be received by the data processing apparatus 200, such that the first image processing circuitry 210 performs image processing operations with respect to the received image data to generate the first video images for the interactive content for display to the user.

Hence more generally, the data processing apparatus 200 comprises the first image processing circuitry 210 configured to generate first video images for an interactive content for display to a user, in which the interactive content is progressed in accordance with user inputs by the user. The first video images (also referred to as interactive content images) may correspond to a locally executed instance of the interactive content or a cloud executed instance of the interactive content. The first video images may be generated according to any suitable frame rate which may be a fixed or variable frame rate.

The user may provide inputs using any suitable input device and/or gesture based inputs detected by one or more image sensors. For example, controller data from a handheld video game controller (such as the DualShock 4 ® or DualSense®) may be used for progressing the interactive content. For example, inputs such as control stick movements, button presses, touchpad inputs and controller motion (sensed by one or more motion sensors of the controller) may be used for this purpose. Alternatively or in addition, one or more image sensors may be provided for capturing images of the user and gesture detection may also be used for progressing the interactive content. Alternatively or in addition, one or more microphones may be provided for capturing voice inputs by the user.

The communication circuitry 220 is configured to receive the portable device data from the portable device via a network. The network may be any suitable wireless network for connecting the data processing apparatus 200 and the portable device such as a wireless Local Area Network (WLAN) or a wireless Personal Area Network (WPAN). For example, both the data processing apparatus 200 and the portable device may be connected to a same WLAN. In particular, both the data processing apparatus 200 and the portable device may be connected to a same WiFi® network. In other examples, the data processing apparatus 200 and the portable device may be connected via a Bluetooth® network or other similar network such as a ZigBee® network.

Hence more generally, the communication circuitry 220 is configured to receive the portable device data for the portable device associated with the user via a wireless communication link with the portable device. Optionally in some cases a wired communication link may be used for connecting the portable device and the data processing apparatus.

The portable device data is indicative of a state of a software application executed on a portable device. The portable device (e.g. a smartphone device and/or smartwatch device and/or table device) may for example periodically communicate portable device data to the data processing apparatus 200. Alternatively or in addition, the portable device may communicate the portable device data to the data processing apparatus in response to receiving a portable device control signal (also referred to herein as a portable device data request signal) from the data processing apparatus. Such a portable device control signal may be communicated in response to a user input received by the data processing apparatus indicating that output of composite video images is requested. Alternatively or in addition, the user may provide one or more inputs using the portable device to initially pair the portable device with the data processing apparatus and the portable device may communicate the portable device data in response to the two devices being paired. In particular, prior to starting (or during) a session for the interactive content, the user may pair the portable device and the data processing apparatus 200. Alternatively or in addition, the user may provide one or more inputs using a handheld controller (or other similar input device) associated with the data processing apparatus 200 to pair the data processing apparatus and the portable device. For example, the data processing apparatus 200 may communicate a portable device control signal to the portable device, via the network, to request the portable device to start communicating the portable device data. Hence more generally, by providing one or more user inputs at any of the portable device and the data processing apparatus 200, the portable device can be caused to communicate portable device data to the data processing apparatus 200 via the network. In particular, in some examples the data processing apparatus 200 can be controlled, responsive to one or more user inputs using a handheld controller, to send a portable device control signal to the portable device, via the network, to instruct the portable device to communicate the portable device data. This is discussed in more detail later.

More generally, the portable device and the data processing apparatus 200 can be connected via the network and portable device data indicative of a state of at least one software application run on the portable device can be communicated to the data processing apparatus 200 during a session for an interactive content. Communication of the portable device data by the portable device can be performed in response to a user input and/or automatically. For example, portable device data may be communicated periodically. Alternatively or in addition, portable device data may be communicated in response to a user input provided at one or more of the portable device and/or the data processing apparatus. In particular, an input via a handheld controller associated with the data processing apparatus 200 may be used to cause the portable device to send portable device data based on the above mentioned portable device control signal.

Various software applications may be installed and executed on the portable device. For example, the received portable device data may be associated with a software application such as one or more of: a software application associated with a gaming platform, a software application associated with a social networking service, a software application associated with weather forecasting; a software application associated with navigation; and an instant messaging software application. In some examples, a privacy setting and/or permission setting for a respective software application installed on the user's portable device may be set by the user for determining whether portable device data associated with the respective software application can be shared with the data processing apparatus. Hence, in some examples the user may set a permission setting for one or more software applications on the portable device indicating that use of the software application with the data processing apparatus 200 of FIG. 2 is permitted or not permitted.

In some examples, portable device data may be received for a software application that is a companion software application for a video gaming console (such as the PlayStation® App) and/or portable device data may be received for a software application that is a companion software application for a respective video game title.

For example, the companion software application when run on the portable device may request (e.g. periodically poll) device information from the network (e.g. a user's home WiFi® network), and receive responses from respective devices on the network via a router identifying those respective devices. In response to receiving a response from the video gaming console (e.g. a device that identifies itself as a PlayStation® 4 or PlayStation® 5 gaming console) for which the companion software application is intended, then the companion software application can automatically communicate portable device data associated with the companion software application for use by the data processing apparatus. Such techniques may also be applicable to software applications other than the above mentioned companion software application.

The second image processing circuitry 230 is configured to generate one or more second video images in dependence on the portable device data. The one or more second video images comprise information associated with a state of a software application executed on the portable device so that the information can be presented to the user using a composite video image without requiring the user to direct their attention to the portable device. The second image processing circuitry 230 can be configured to generate a respective second video image in dependence on a state of a respective software application executed on the portable device, in which the respective second video image visually depicts information associated with the state of the respective software application. For example, the software application may have a state indicative of other users (e.g. friends) and their online statuses, and a respective second video image can be generated for visually depicting an identifier for the other users (e.g. a user name and/or profile picture) and their online status. In particular, the software application may be an application such as the PlayStation® App for providing access to a community of users, and one or more second video images can be generated by the data processing apparatus 200 for displaying content associated therewith via one or more composite video images. Therefore, in some examples the composite video images may include content indicating other users of an online community (e.g. by indicating usernames and/or other suitable identifiers) and their current status (e.g. whether they are online, time spent online and/or time since last online and so on).

In some examples, the portable device data is indicative of a state of a first software application and a state of a second software application executed on the portable device. The second image processing circuitry 230 can be configured to generate a respective second video image in dependence on a state of the first respective software application and generate another respective second video image in dependence on a state of the second respective software application. For example, a respective second video image can be generated for an instant messaging software application for visually depicting content associated with that application, and another respective second video image can be generated for a video game companion software application for visually depicting content associated with that application. The two respective second video images may both be arranged within a same composite video image so as to be displayed simultaneously with the interactive content.

Alternatively, in some examples a respective second video image may be generated which comprises: a first portion comprising content associated with the first software application executed on the portable device; and a second portion comprising content associated with the second software application executed on the portable device. Hence, the second image processing circuitry 230 may in some cases generate a respective second video image to comprise content associated with two or more software applications executed on the portable device. More generally, a second video image may comprise a plurality of portions each associated with a different software application for which the portable device data is received.

In the above discussion references to the second image processing circuitry 230 being configured to generate one or more second video images for display in dependence on portable device data indicative of a state of a software application executed on a portable device encompass the portable device data being indicative of an image associated with the state of the software application and/or the portable device data being indicative of information associated with the state of the software application and suitable for generating an image associated with the state of the software application.

The portable device data may comprise image data for an image associated with the state of the software application. For example, image data for an image associated with a state of a graphical user interface (e.g. a home screen) for a software application may be included in the portable device data. Such an image may include a list of associated users (e.g. friends), indicators of their online statuses and possibly one or more messages. Alternatively or in addition, the portable device data may comprise information suitable for generating an image associated with the state of the software application. For example, information indicating a name of an associated user for a software application (e.g. a username) and an online status may be included in the portable device data. In particular, a file such as a text file comprising information identifying one or more users and their online status may be included in the portable device data. Such information can be processed by the data processing apparatus 200 for generating one or more of the second video images. In some examples, the second image processing circuitry 230 can be configured to generate a second video image in dependence on portable device data indicative of information associated with the state of the software application by using a template image and populating the template image based on the portable device data.

In some cases, the portable device data may comprise image data associated with a current screen of the portable device data (e.g. image data for the current screen may be included in the portable device data when the screen of the portable device is active). Hence, in some examples portable device data comprising a video stream corresponding to a current screen of the portable device may be streamed to the data processing apparatus for use in generating second video images.

More generally, in some cases portable device data comprising image data associated with a state of a software application executed on the portable device can be received by the data processing apparatus and the second image processing circuitry 230 can be configured to generate one or more second images in dependence on such image data.

Generally, a portable device such as a smartphone device, smartwatch device and tablet device has a screen size smaller than a screen size of a device, such as a television, used for viewing interactive content. Hence, image processing operations can be performed by the second image processing circuitry 230 to generate second video images with a size and/or aspect ratio appropriate for a display device (e.g. television and/or HMD) to be used for displaying the video images output by the output circuitry 250. In particular, a smartphone device may have a diagonal screen length of a few inches (e.g. around 6 inches) and a certain image resolution and aspect ratio. Hence the second image processing circuitry 230 can be configured to perform image processing with respect to image data associated with the portable device data to generate one or more second video images with a size, aspect ratio and/or resolution suitable for use with a display device such as a television and/or HMD. In some examples, the second image processing circuitry 230 is configured to perform image upscaling operations using image data received from the portable device.

Generation of second video images by the second image processing circuitry may be performed at any time, and may thus be performed even at times when the control value corresponds to output of the first video images instead of output of the composite video images. In some cases, generation of second video images by the second image processing circuitry may be controlled to be performed only when the control value corresponds to output of composite video images. Hence, in some cases one or more second video images may be generated and temporarily stored and used for output as part of a composite image at a later time.

In the case where the control value indicates that first video images are to be output, in response to the second image processing circuitry generating one or more second video images, the one or more second video images can be temporarily stored by storage circuitry provided as part of the data processing apparatus so as to be available for being output as part of a composite video image at a later time when the control value indicates that composite video images are to be output. However, in the case where the control value indicates that composite video images are to be output, in response to the second image processing circuitry 230 generating one or more second video images, the one or more second video images can be output as part of a composite video image without use of the storage circuitry. The storage circuitry may for example comprise buffer storage circuitry comprising volatile memory such as random access memory.

Hence more generally, the second image processing circuitry 230 can be configured to generate a second video image in dependence on the portable device data and the second video image can provided to the output circuitry 250 and either output or temporarily stored (e.g. by storage circuitry provided as part of the data processing apparatus) depending on the control value set by the control circuitry 240. Hence in some examples, the output circuitry may comprise one or more buffers for temporarily storing one or more second video images.

In some examples, the data processing apparatus 200 may comprise portable device data storage circuitry configured to store the portable device data. This can potentially allow more efficient use of memory in that portable device data (which may be smaller in size than the second video images) can be stored and second video images generated for display when requested by the user. Hence, in some examples the second image processing circuitry may be controlled so as to be active when the control value is set to a state indicating that composite video images are to be output and controlled to be inactive when the control value is set to a state indicating that first video images are to be output.

Alternatively or in addition, in response to the control value being set to a state indicating that composite video images are to be output, the communication circuitry 220 may be controlled to communicate a portable device control signal to the portable device for requesting transmission of portable device data by the portable device. Therefore, in response to the user providing a user input to set the control value to a state for outputting the composite video image, portable device data can be requested, received and used for generating one or more second video images for output as part of a composite video image. Alternatively or in addition to the data processing apparatus requesting transmission of portable device data by the portable device, the portable device may periodically transmit portable device data to the data processing apparatus.

The control circuitry 240 is configured to set the control value (also referred to as a control setting) in response to a user input by the user. As explained in more detail later, the control value can be set by the user using a user input provided by one or more of a handheld controller device, a voice input detected by one or more sound sensors, and a visually detected gesture by a body part. The output circuitry 250 is configured to selectively output one of a first video image (generated by the first image processing circuitry) and a composite video image (comprising a first video image generated by the first image processing circuitry and a second video image generated by the second image processing circuitry) in dependence on the control value. Therefore, the user can provide one or more user inputs for controlling whether a first video image or a composite video image is output for display to the user.

More generally, the first image processing circuitry 210 can be configured to generate a sequence of first video images for the interactive content, and the output circuitry 250 can be configured to output the sequence of first video images and then switch to outputting a sequence of composite video images obtained by compositing the sequence of first video images with one or more second video images in response to the control value indicating that output of composite video images is requested. Subsequently, if the control value is updated to indicate that output of first video images is requested, then the output circuitry 250 can be configured to switch back to outputting the sequence of first video images.

Figure 3:
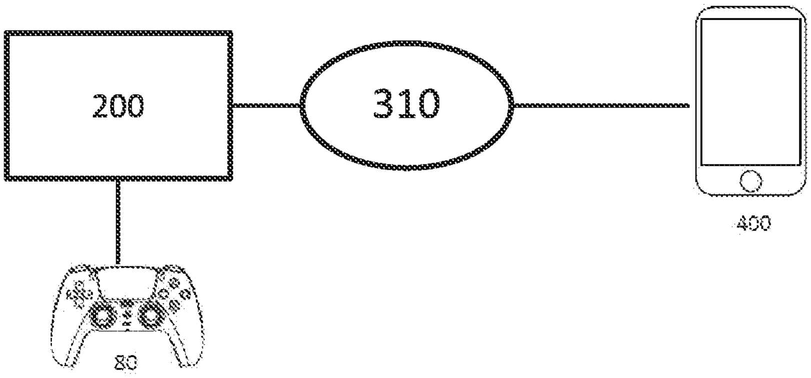
FIG. 3 is a schematic diagram illustrating a system.

FIG. 3 schematically illustrates an example of a system comprising the data processing apparatus 200 and a portable device 400 connected via a network 310. In the example of FIG. 3, the user provides inputs to the apparatus 200 using a handheld controller 80. The portable device 400 is shown in this example as being a smartphone device. The data processing apparatus 200 can receive the portable device data from the portable device 400 via the network 310 (e.g. a WiFi® or Bluetooth® network). The network 310 may be a local area network, such as home network comprising a router connected to the internet via a telephone landline or cable using ADSL or similar. Hence, in some examples both the apparatus 200 and the portable device 400 may be connected via a router of a local area network. Video images output by the data processing apparatus 200 may be displayed using one or more of a display device (e.g. television) and an HMD.

According to the control value set based on a user input provided via the handheld controller 80, a sequence of video images depicting the interactive content may initially be output and displayed and, in response to an input by the user that changes the control value, the data processing apparatus 200 can switch to outputting a sequence of composite video images depicting both the interactive content and content associated with the portable device data. The sequence of composite video images may be output until a time at which another user input by the user changes the control value.

Figure 4A:
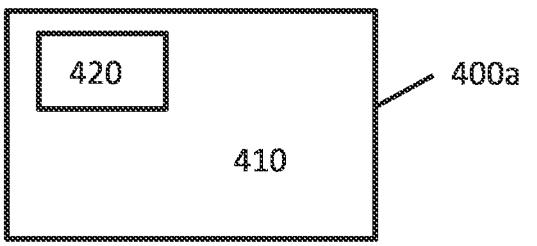
FIGS. 4*a*, 4*b* and 4*c* are schematic diagrams illustrating examples of composite images.

FIG. 4*a* schematically illustrates an example of a respective composite video image 400*a* comprising a portion 410 comprising at least some of a first video image for the interactive content and another portion 420 comprising at least some of a second video image generated in dependence on the portable device data. Hence, in the example of FIG. 4*a* the portion 410 can be used for viewing the interactive content and the portion 420 can be used for viewing content associated with one or more of the software applications.

More generally, a sequence of composite images each having the arrangement shown in FIG. 4*a* may be output by the output circuitry, and first video images generated by the first image processing circuitry 210 can be displayed in the portion 410, and one or more second video images generated by the second image processing circuitry 230 can be displayed in the portion 420. In particular, in some examples the portion 410 may display the sequence of first video images and the portion 420 may display a same second video image (e.g. a second video image depicting a state of a graphical user interface for a software application, such as showing names of users and their online statuses) that is re-used for multiple composite video images.

More particularly, the first image processing circuitry 210 may generate the first video images with a frame rate of X Hz (e.g. 60 Hz or 120 Hz or another suitable value). The composite video images can be output with a same frame rate (X Hz) by compositing each first video image with a second video image. A same second video image may be composited with each of two or more successive first video images. In particular, a second video image comprising a graphical user interface associated with a software application running on the portable device may comprise information such as friends and their online statuses (and which may only be occasionally subject to change). Therefore, a second video image may be generated and used in multiple successive composite video images. Alternatively in some cases, the second video image may comprise animated content (e.g. a live video stream associated with the software application which is received either from the portable device or from a remote server indicated by a link included in the portable device data) and the second video images may be generated with a frame rate that is the same or substantially the same as that of the first video images. Hence in some examples, composite video images may be output in which the portion 410 depicts the on-going interactive content and the portion 420 depicts one or more video streams associated with one or more of the software applications.

Figure 4B:
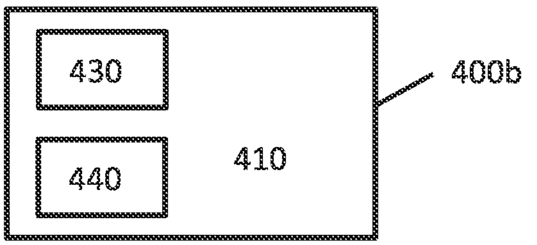

FIG. 4*b* schematically illustrates another example of a composite video image 400*b*. The composite video image 400*b* comprises a portion 410 comprising at least some of a video image for the interactive content. The portion 430 comprises at least some of a video image generated in dependence on portable device data associated with a first software application executed on the portable device. The portion 440 comprises at least some of a video image generated in dependence on portable device data associated with a second software application executed on the portable device. Hence, the portions 430 and 440 may be used for displaying content associated with different software applications.

Figure 4C:
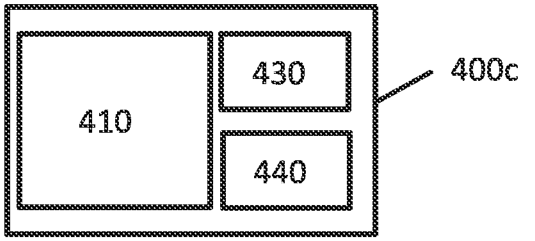

In the examples of FIGS. 4*a* and 4*b*, the composite image is shown as having the image portions 420, 430 and 440 overlaid so that part of the video image for the interactive content is obscured. However, in other examples the portion 410 may be juxtaposed with respect to the second video image portion(s). For example, the portion 410 may be arranged on a left side of the composite image and the portions 420, 430, 440 may be arranged on the right side of the composite image. FIG. 4*c* schematically illustrates an example of such a composite image 400*c*.

In some examples, the portion of the composite video image comprising the one or more second video images may be interacted with via a user input in order to update a content presented in the portion. For example, a scrolling input may be used to perform a scroll operation with respect to a second video image in the composite video image to request to scroll the content in a given direction. The second video images can be generated by the second image processing circuitry in response to the scrolling input to vary the content included in the second video images. This may be achieved by the second image processing circuitry 230 generating a second video image for display using a portion of the portable device data associated with a given software application so that the second image displays some of the content for the given software application, and in response to the scrolling input, selecting another portion of the portable device data that has been received for the given software application to generate a next second video image using the another portion.

Hence more generally, in some embodiments of the disclosure, the second image processing circuitry is configured to: generate a respective second image for display in dependence on a first portion of the portable device data received for a given software application; select a second portion of the portable device data received for a given software application in response to a user input with respect to a composite video image indicative of a content update request (e.g. a scrolling input); and generate a next second image for display in dependence on a second portion of the portable device data received for the given software application. The first portion and the second portion may be partially overlapping or non-overlapping. For example, the first portion and the second portion may be partially overlapping in the case of the user scrolling the second video image in the composite video image, and may be non-overlapping in the case of the user selecting a GUI element.

Figure 5:
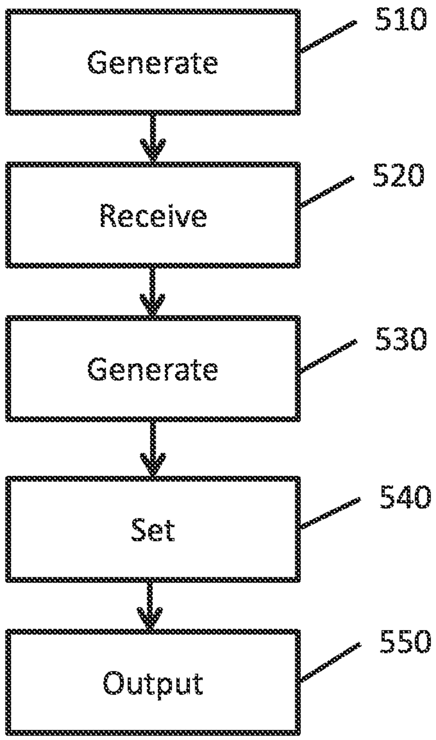
FIG. 5 is a schematic flowchart illustrating a method.

FIG. 5 schematically illustrates a method in accordance with embodiments of the disclosure. The method comprises: generating (at a step 510) first video images for an interactive content for display to a user; receiving (at a step 520), via a network, portable device data indicative of a state of a software application executed on a portable device associated with the user; generating (at a step 530) one or more second video images for display in dependence on the portable device data;

setting (at a step 540) a control value in response to a user input by the user; and selectively outputting (at a step 550) one of a first video image and a composite video image in dependence on the control value, wherein the composite video image comprises a portion comprising at least some of the first video image and another portion comprising at least some of a second video image.

Referring again to FIG. 2, in some embodiments of the disclosure the control circuitry 240 is configured to set the control value to one of a first state and a second state in response to a user input, and wherein in response to the control value having the first state the output circuitry 250 is configured to output the composite video image, and wherein in response to the control value having the second state the output circuitry 250 is configured to output the first video image. The output circuitry 250 can be configured to output an output video sequence with any suitable frame rate, and each frame corresponds to a first video image or a composite video image. The control value can be set to one of a first state and a second state in response to a user input so that whether a first video image or a composite video image is output for display can be controlled by the user. Therefore, whilst viewing the images output by the output circuitry 250 the user can switch between viewing first video images depicting just the interactive content and viewing composite video images depicting both the interactive content and content associated with one or more software applications on the portable device. The user input for setting the control value may be provided via one or more of a handheld controller, a speech input and a gesture input by a body part of the user.

In some embodiments of the disclosure, the control circuitry 240 is configured to switch the control value between the first state and the second state in response to a same user input. The control circuitry 240 can be configured to switch the control value from the first state to the second state in response to a first respective user input and to switch the control value from the second state to the first state in response to another respective user input, in which the first respective user input and the another respective user input correspond to a same action by the user. For example, a dedicated button on a handheld controller may be used for switching the control value so that a first activation of the button changes the control value from the first state to the second state and a second activation of the same button changes the control value from the second state to the first state. A dedicated button such as an L2 button, or other button, on the DualSense® may be used for this. The button used for setting the control value may be pre-programmed and/or specified by a user.

Alternatively or in addition to the use of a button of a handheld controller, a given tracked movement of the handheld controller may be used to switch the control value between the first state and the second state. For example, a sharp upward motion and/or rotation of the handheld controller in a given direction may be used for switching the control value. Alternatively or in addition, a gesture by a body part such as a swipe gesture in which the hand and arm swipe in a given direction may be used for switching the control value. Such a gesture can be detected in one or more images captured by one or more image sensors using known gesture recognition techniques. Hence, in some examples the data processing apparatus 200 may comprise gesture recognition circuitry configured to execute one or more known gesture recognition algorithms to detect one or more gestures in images captured of the user.

Hence more generally, in some embodiments of the disclosure the respective user input that is used for switching the control value between the first state and the second state comprises one or more of: activation of a same input of a handheld controller; a same tracked movement of the handheld controller; and a same gesture by the user.

In some embodiments of the disclosure, the control value is a flag value having only a first state and the second state. Hence, one user input may be used as a toggle input for toggling the control value between the two states.

In other embodiments of the disclosure, the control value may have a plurality of possible states. For example, the control value may have a first state, second state and third state. The first state and the second state may be as discussed above so that the output circuitry outputs composite video images when the control value corresponds to the first state, and the output circuitry outputs the first video images when the control value corresponds to the second state. The third state may be provided so that when the control value corresponds to the third state, the output circuitry outputs composite images, in which composite images output for the third state have a different composition ratio from composite images output for the first state. In particular, in response to the control value having the first state the output circuitry 250 can be configured to output a composite video image in which the one or more second video images occupy a first proportion of the composite video image (e.g. M %), and in response to the control value having the third state the output circuitry 250 can be configured to output a composite video image in which the one or more second video images occupy a second proportion of the composite video image (e.g. N %), where the first proportion is different to the second proportion (N≠M). In some examples, a same respective user input may be used for setting the control value to one of the first, second and third states, or two or more different respective user inputs may be used. For example, a same respective button of a handheld controller may be used so that activation of the button switches between the first state and the second state as discussed previously. A double activation of the respective button within a predetermined period of time may be used to switch the control value to the third state, and when the control value corresponds to the third state a subsequent activation switches back to the second state. This can provide quick and intuitive switching of the control value. For example, activation of the button can be used to enable and disable viewing of composite video images and, in response to a double tap input, composite video images in which the one or more second video images (which correspond to content associated with the one or more software applications executed on the portable device) correspond to a larger proportion of the composite video image can be output. In other examples, different respective buttons (or combinations of button inputs) may be used for setting the control value to one of the plurality of states.

In some embodiments of the disclosure, the second image processing circuitry is configured to generate one or more of the second video images according to at least one of a size and aspect ratio set in response to a setting input by the user. Referring to FIG. 4*a*, for example, one of more of a size, aspect ratio, position and orientation of the portion 420 may be set in response to a setting input by the user. Referring to FIG. 4*b*, similarly a property (size, aspect ratio, position and/or orientation) may be set for each of the portions 430 and 440. Whilst the portions 430 and 440 are shown as having a same size in FIG. 4*b*, the sizes of the portions can be set in response to a user input and the two portions may have different sizes. In particular, in the case of viewing a composite image such as that in FIG. 4*b*, the user may wish to expand the portion 430 to more easily view the associated content. Hence, a setting input by the user which comprises one or more of selection of a portion comprising a second video image and/or one or more drag operations for the portion may be used to set a size and/or aspect ratio and/or position and/or orientation for the portion.

Hence more generally, the output circuitry 240 may output a given composite video image comprising a first portion comprising at least some of the first video image and another portion (e.g. 420) comprising at least some of a second video image, and in response to one or more used inputs with respect to the given composite video image (such as a dragging and/or expanding input for the another portion), the second image processing circuitry can generate another second video image with a different size and/or aspect ratio, and/or the another second video image can be arranged with respect to the composite video images with a different position and/or orientation.

In some embodiments of the disclosure, one or more of the second video images comprise information indicative of one or more other users having user accounts associated with the software application and information indicative of an online status associated with one or more of the other users. The software application being executed on the portable device may be a software application for which the user of the portable device (referred to as the first user in the discussion below) is logged into their account and the first user's account is associated with accounts of other users. For example, the other users may be friends of the first user and/or users that the first user is interested in following. The portable device data associated with the software application can thus indicate accounts of the other users and an online status (e.g. an active/not active status) with respect to the user accounts. In this way, by viewing composite video images comprising at least some of a second video image, the user can determine other associated users that are active with respect to the software application. In particular, the user can quickly switch between viewing first video images and composite video images and thus be visually informed of other associated users that are active without having to direct their attention away from the interactive content.

In some embodiments of the disclosure, the software application executed on the portable device corresponds to a companion software application for a gaming platform. For example, the software application may correspond to the PlayStation® App for the PlayStation® gaming platform.

In some embodiments of the disclosure, the data processing apparatus 200 is a video game console, and the software application executed on the portable device corresponds to a companion software application for a gaming platform associated with the video game console. Hence, the companion software application for a gaming platform may be used by the user for viewing information such as other online users, information regarding new video game releases and/or information regarding trophies and other achievements, and such information can be made available for viewing via the composite video images so that such information can be viewed during interactive content without having to view the portable device.

In some embodiments of the disclosure, the software application executed on the portable device corresponds to a companion software application for the interactive content and one or more of the second video images comprise supplementary information for the interactive content. The companion software application may be specific to the interactive content that is currently being displayed to the user. For example, the interactive content may be a video game (processed by one or more of the data processing apparatus 200 and one or more servers of a cloud-gaming service), and the software application may be a companion application run on the portable device that relates specially to that video game for providing information. For example, the video game may be a sports game (e.g. EA Sports® FIFA) and the software application may be a companion application for the sports game which provides various information with respect to the sports game. Hence more generally, in some embodiments of the disclosure, the interactive content is a video game and the supplementary information comprises information associated with the video game.

In some embodiments of the disclosure, one or more of the second video images comprise information indicative of one or more text-based messages between one or more other users and the user using a software application executed on the portable device. Text-based messages exchanged between the user and other associated users using the software application installed on the portable device can be included in the composite video image. For example, the portable device data for an instant messaging application may comprise information indicative of the text-based messages exchanged using that application. Hence, in the case of the user's portable device receiving a new message during participation in the interactive content, the user can choose to view composite video images to view the new message, thus allowing the user to continue the interaction with the interactive content uninterrupted (e.g. playing a video game). In some examples, a user input provided by the user to the data processing apparatus 200 can be communicated to the portable device for updating a state of a software application executing on the portable device. Specially, a user input for updating a software application executing on the portable device with a new message can be provided so that the user can send a message to one or more of their friends via the software application. For example, an audio input provided by the user may be detected by one or more audio sensors associated with the data processing apparatus 200 and at least one of audio data indicative of the audio input and text data indicative of the audio input can be communicated for use by the software application executing on the portable device. For example, a speech-to-text algorithm may be used by one or more of the data processing apparatus 200 and the portable device to generate text data for the audio input, which can be provided to the software application for sending a text-based message.

In some embodiments of the disclosure, the portable device data comprises data indicative of at least one server-based video stream associated with the software application executed on the portable device, and the data processing apparatus is configured to start receiving image data for the at least one server-based video stream from a server in response to receiving the portable device data, and wherein the second image processing circuitry is configured to generate one or more of the second images in dependence on the received image data. One or more software applications executed on the portable device may be used for viewing server-based video streams. The portable device data may thus indicate a location from which the video stream can be accessed so that streaming of the video stream to the data processing apparatus can instead be performed. For example, the portable device data may comprise a link (such as a URL) for accessing the video stream. Hence, at least one server-based video stream associated with the software application executed on the portable device can be caused to be received by the data processing apparatus and processed to obtain second video images for inclusion in the composite video image.

In some embodiments of the disclosure, the at least one server-based video stream is a live video stream comprising image data for one or more video games played by one or more users. The software application may correspond to an application for viewing live (and or on-live) video streams of video games. For example, an application such as the Twitch® App for Android or iOS may be executed on the portable device. The portable device data may comprise one or more links for accessing one or more video streams currently streaming on the application. The composite video images can thus potentially be output for displaying one or more such video streams.

In some embodiments of the disclosure, the communication circuitry 220 is configured to transmit, via the network, a portable device control signal indicating that transmission of the portable device data by the portable device is requested. The portable device control signal may be periodically transmitted to periodically request portable device data. Alternatively or in addition, the portable device control signal may be transmitted in response to a switch of the control value from the second state to the first state. The portable device can thus receive the portable device control signal, via the network, and in response thereto communicate portable device data indicative of a state associated with one or more software applications currently running on the portable device. Hence, most recent portable device data can be received in response to the portable device control signal.

Application program interfaces (APIs) associated with one or more software applications on the portable device may be called by the portable device control signal. Portable device data associated with one or more of the software applications can be provided in response to the portable device control signal. In some examples, an API associated with a companion software application on the portable device (such as a companion application for one or more of a gaming platform associated with the apparatus 200 and the interactive content being processed) may be called by the portable device control signal. The companion software application may have access to one or more other software applications on the portable device, so that the companion software application can receive and gather portable device data from each of the one or more other software applications. Hence, the portable device control signal may be used to a call to an API associated with a companion application which gathers data from other software applications, and portable device data obtained by the companion application can be communicated by the portable device.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A computer-implemented method comprising:

providing, for display to a user and by a gaming console, video images that are associated with interactive content;

receiving, by the gaming console and from a mobile phone that is associated with the user, data on the mobile phone of the user;

determining, by the gaming console, that the user has designated a control value that is associated with providing composite video images for display; and in response to determining that the user has designated the control value that is associated with providing the composite video images for display:

generating, by the gaming console, the composite video images based at least on the received data from the mobile phone of the user, and providing, for display to the user and by the gaming console, the composite video images.

2. The method of claim 1, wherein the control value has a first state and a second state, and wherein:

in response to the control value having the first state, the gaming console provides the composite video images for display; and in response to the control value having the second state, the gaming console provides for display the video images that are associated with the interactive content without the composite video images.

3. The method of claim 2, wherein a user input toggles the control value between the first state and the second state.

4. The method of claim 3, wherein the user input comprises any one or more of:

activation of an input of a handheld controller;

a tracked movement of the handheld controller;

a gesture by the user; and a voice input by the user.

5. The method of claim 1, wherein the data received from the mobile phone comprises application-state data produced by a software application executing on the mobile phone.

6. The method of claim 5, wherein generating the composite video images comprises:

generating, by the gaming console, second video images based at least in part on the application-state data; and compositing at least some of the second video images with at least some of the video images that are associated with the interactive content.

7. The method of claim 6, wherein generating the second video images comprises generating the second video images according to at least one of: a size; and an aspect ratio, that is set in response to a setting input by the user.

8. The method of claim 5, wherein the application-state data comprises information indicative of one or more other users having user accounts associated with the software application and information indicative of an online status associated with one or more of the one or more other users.

9. The method of claim 5, wherein the application-state data comprises information indicative of one or more text-based messages between one or more other users and the user using the software application.

10. The method of claim 1, wherein the software application executing on the mobile phone corresponds to a companion software application for the interactive content and the composite video images comprise supplementary information for the interactive content.

11. The method of claim 10, wherein the interactive content is a video game and the supplementary information comprises information associated with the video game.

12. The method of claim 5, wherein the data received from the mobile phone comprises data indicative of at least one server-based video stream associated with the software application executing on the mobile phone, and the method further comprises:

in response to receiving the data, initiating receipt, by the gaming console and from a server, of image data for the at least one server-based video stream; and generating at least some of the composite video images based at least in part on the image data for the at least one server-based video stream.

13. The method of claim 12, wherein the at least one server-based video stream is a live video stream comprising image data for one or more video games played by one or more users.

14. The method of claim 1, further comprising transmitting, by the gaming console and via a network to the mobile phone, a portable-device control signal indicating that transmission of the data by the mobile phone is requested.

15. The method of claim 14, wherein transmitting the portable-device control signal occurs in response to determining that the user has designated the control value that is associated with providing the composite video images for display.

16. The method of claim 1, wherein providing the video images and the composite video images for display comprises outputting the video images and the composite video images to at least one of: a display device; and a head-mounted display unit (HMD).

17. One or more computer storage media encoded with instructions that, when executed by one or more computers, cause the one or more computers to perform operations, the operations comprising:

providing, for display to a user and by a gaming console, video images that are associated with interactive content;

receiving, by the gaming console and from a mobile phone that is associated with the user, data on the mobile phone of the user;

determining, by the gaming console, that the user has designated a control value that is associated with providing composite video images for display; and in response to determining that the user has designated the control value that is associated with providing the composite video images for display:

generating, by the gaming console, the composite video images based at least on the received data from the mobile phone of the user, and providing, for display to the user and by the gaming console, the composite video images.

18. The one or more computer storage media encoded with the instructions of claim 17, wherein the control value has a first state and a second state, and wherein:

in response to the control value having the first state, the gaming console provides the composite video images for display; and in response to the control value having the second state, the gaming console provides for display the video images that are associated with the interactive content without the composite video images.

19. The one or more computer storage media encoded with the instructions of claim 18, wherein a user input toggles the control value between the first state and the second state.

20. A gaming console comprising one or more processors and non-transitory memory storing instructions that, when executed by the one or more processors, cause the gaming console to:

provide, for display to a user and by the gaming console, video images that are associated with interactive content;

receive, by the gaming console and from a mobile phone that is associated with the user, data on the mobile phone of the user;

determine, by the gaming console, that the user has designated a control value that is associated with providing composite video images for display; and, in response to determining that the user has designated the control value that is associated with providing the composite video images for display:

generate, by the gaming console, the composite video images based at least on the received data from the mobile phone of the user, and provide, for display to the user and by the gaming console, the composite video images.

* * * * *